E. R. HIBBARD.
PROCESS OF MAKING SELF LOCKING NUTS.
APPLICATION FILED DEC. 21, 1905.
958,810.
Patented May 24, 1910.
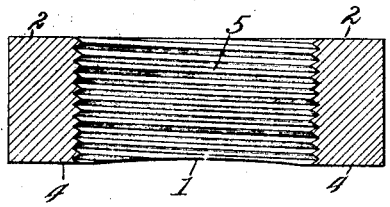
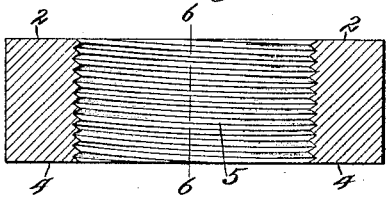
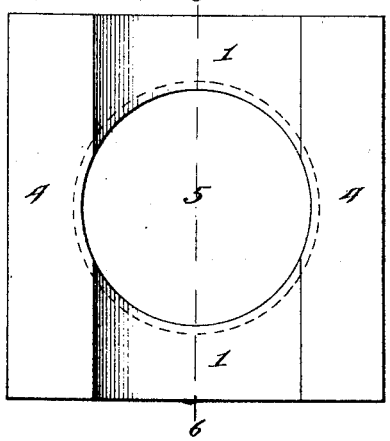
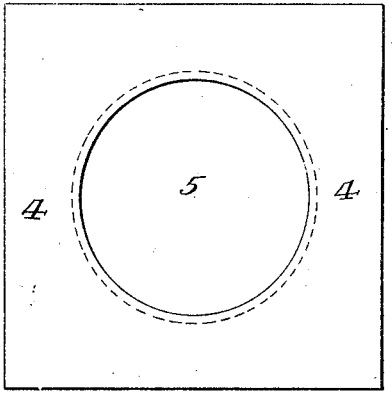

E. R. HIBBARD.
PROCESS OF MAKING SELF LOCKING NUTS.
APPLICATION FILED DEC. 21, 1905.

958,810.

Patented May 24, 1910.
2 SHEETS—SHEET 2.

Witnesses:

Inventor:
Edward R. Hibbard,
By: Hill & Hill,
Attys:

UNITED STATES PATENT OFFICE.

EDWARD R. HIBBARD, OF OAK PARK, ILLINOIS, ASSIGNOR TO GRIP NUT COMPANY, OF CHICAGO, ILLINOIS, A CORPORATION OF ILLINOIS.

PROCESS OF MAKING SELF-LOCKING NUTS.

958,810.  Specification of Letters Patent.  Patented May 24, 1910.

Application filed December 21, 1905. Serial No. 292,750.

*To all whom it may concern:*

Be it known that I, EDWARD R. HIBBARD, a citizen of the United States, residing at Oak Park, county of Cook, and State of Illinois, have invented a certain new, useful, and Improved Process for Making Self-Locking Nuts, of which the following is a description.

My improvement relates to screw-threaded nuts and especially to that type of nuts which are provided with means to grip the bolt upon which the nut is mounted and prevent accidental movement between the nut and bolt.

The object of my invention is to produce a nut of the kind described, inexpensive to manufacture, convenient to use, positive in its action, and of the usual or any preferred form entirely free from slots, grooves, projections or any other visible means for producing the gripping action upon the bolt.

To this end my invention consists in the novel construction and process herein shown and described and more particularly pointed out in the claims.

Figure 5:
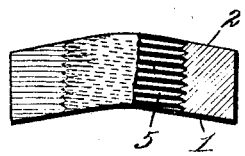
Figure 6:
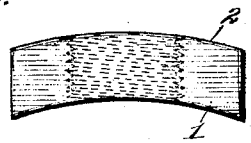
Figure 7:
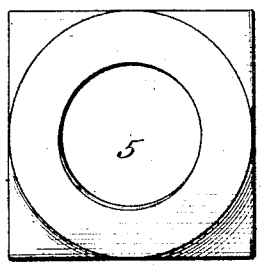
Figure 8:
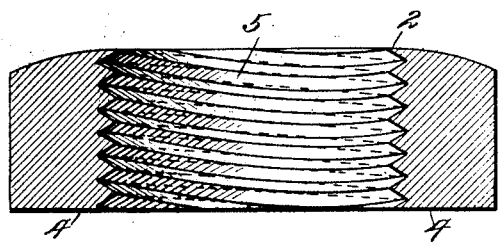

In the accompanying drawings wherein like or similar reference characters indicate like or corresponding parts; Figure 1 is a section taken substantially on line 6—6 of Fig. 3 showing my nut as threaded but before its face is straightened to produce the locking effect. Fig. 2 is a plan view of the nut as shown in Fig. 1. Fig. 3 is a section similar to Fig. 1 but showing the finished nut. Fig. 4 is a plan view of the finished nut as shown in Fig. 3. Fig. 5 is an elevation partly in section showing a slightly modified form of blank for producing my nut, before its face is straightened. Fig. 6 is an elevation of another modified form of nut blank. Fig. 7 is a common form of nut curved as shown in Figs. 5 and 6. Fig. 8 is an enlarged section showing a finished nut formed from the blank shown in Figs. 5 and 6.

It should be noted that in Figs. 1, 5 and 6, the curve of the nut, and in Figs. 3 and 8, the curve of the threads from the normal is shown somewhat exaggerated, especially in Figs. 5, 6 and 8, to more clearly show the construction. In actual practice the curvature is so slight as to be scarcely noticeable and amounts to but a fractional part of the pitch.

In the preferred form of my device shown in the drawings, a screw-threaded nut blank is provided with a concave face, that is providing one face with a depression 1 preferably extending entirely across the nut. The depression 1 may be of any width. In Fig. 1 it is shown less in width than the diameter of the threaded opening, while in Figs. 5 and 6 it occupies the entire face of the nut. In either case the depth of the depression is slight and amounts to not more, and preferably considerably less, than one-half of the pitch of the thread of the nut in the diameter of the bolt hole. The opposite face 2 of the nut may be flat as shown in Fig. 1, or curved to correspond in outline with the face 1. In the first form the nut is gradually reduced in thickness from its margins 4—4 at opposite sides of the opening 5 to the center 6—6 of the nut. In the latter form the thickness of the nut remains uniform. After the nut is formed and threaded as above described it is subjected to pressure, preferably between two flat surfaces, sufficient to substantially eliminate the depression 1 and straighten both faces of the nut.

In the form shown in Figs. 1 and 2, this pressure seems to compress the margins 4 of the nut substantially uniformly through to the face 2 producing a nut in which the pitch of its threads vary at different points about its threaded opening. At the center line 6 the threads are practically normal entirely through the nut while at the margins 4 the pitch of the threads is reduced entirely through the nut as shown in Fig. 3, thus bending the threads from a true helix and from their normal plane along a plurality of lines extending through the nut.

In the form shown in Figs. 5, 6 and 7, the pressure above described merely straightens the nut and in so doing bends the threads slightly from a true helix at opposite sides of the opening 5 but in this case the pitch of the threads is not necessarily distorted.

Obviously in either form the bending or deflection of the threads is preferably very slight or otherwise difficulty might be experienced in mounting the nut upon a bolt. When properly made however, as above described, a bolt of ordinary form may be readily engaged in the nut at either face and will begin to bind upon the threads to lock the same as soon as three or four threads are engaged.

From the above it is to be noted that it is not essential for the depression 1 to be formed in the working face of the nut, although in actual practice I have found it more convenient when so made owing to the usual chamfered corners and general form of the other face of the nut blanks as ordinarily made.

In general outward appearance my nut corresponds in every way with the usual or ordinary nut and it is obvious therefore that my improvement may be embodied in any class or form of nut, or nuts employed for any purpose, or formed of any material and that it is immaterial whether the outline of the depression be formed by flat planes meeting at a slight angle as shown for example in Fig. 5, or whether the surface be curved as shown in Figs. 1 and 6.

The whole invention consists in producing a nut of any preferred form having a flat working face if desired, but with threads so curved or formed that while a bolt may be freely engaged with the threads of the nut at either of its faces, it will firmly lock upon the bolt when screwed down thereon.

Having thus described my invention what I claim as new, and desire to secure by Letters Patent is:—

1. The herein described process of forming a lock-nut consisting in forming a blank with a depression extending across the central portion of the nut, threading said blank in the usual manner and then straightening said blank by compression, whereby all of the threads in said nut are permanently distorted from a true helix.

2. The herein described process of forming a lock-nut consisting in forming a blank with a depression extending across the central portion of the nut less than one-half the depth of the intended pitch of its threads, cutting threads in said blank in the usual manner and then straightening said blank by the compression, whereby all of the threads in said nut are permanently distorted from a true helix along a plurality of lines extending through said nut.

3. The herein described process of forming a lock nut consisting of forming a blank and cutting the thread therein, and thereafter compressing a portion of the walls of said blank longitudinally of the threaded opening to permanently reduce the pitch of all the threads at said compressed portion whereby the threads in said nut are permanently distorted from a true helix.

In testimony whereof, I have hereunto signed my name in the presence of two subscribing witnesses.

EDWARD R. HIBBARD.

Witnesses:
    WM. A. LAKE,
    J. M. DOWNEY.